US009364093B2

(12) United States Patent
Williams et al.

(10) Patent No.: US 9,364,093 B2
(45) Date of Patent: Jun. 14, 2016

(54) CHAIR RISER ASSEMBLY

(71) Applicants: Ronald L. Williams, Arlington Heights, IL (US); Anthony J. Nowakowski, Crystal Lake, IL (US)

(72) Inventors: Ronald L. Williams, Arlington Heights, IL (US); Anthony J. Nowakowski, Crystal Lake, IL (US)

( * ) Notice: Subject to any disclaimer, the term of this patent is extended or adjusted under 35 U.S.C. 154(b) by 0 days.

(21) Appl. No.: 14/707,567

(22) Filed: May 8, 2015

(65) Prior Publication Data
US 2015/0320221 A1   Nov. 12, 2015

Related U.S. Application Data

(60) Provisional application No. 61/990,864, filed on May 9, 2014.

(51) Int. Cl.
| A47C 7/00 | (2006.01) |
| A47C 7/62 | (2006.01) |
| A47B 91/02 | (2006.01) |
| F16M 11/24 | (2006.01) |
| F16M 11/32 | (2006.01) |
| A47B 91/00 | (2006.01) |

(52) U.S. Cl.
CPC .................. *A47C 7/62* (2013.01); *A47B 91/005* (2013.01); *A47B 91/02* (2013.01); *A47C 7/002* (2013.01); *F16M 11/24* (2013.01); *F16M 11/32* (2013.01)

(58) Field of Classification Search
CPC .......... A47C 7/002; A47C 7/62; F16M 11/32; F16M 11/24; A47B 91/02; A47B 91/005
See application file for complete search history.

(56) References Cited

U.S. PATENT DOCUMENTS

| 2,521,281 | A | * | 9/1950 | Brousseau | A47D 1/103 248/421 |
| 2,871,616 | A | * | 2/1959 | Sundell | A47B 91/04 248/188.3 |
| 2,935,813 | A | * | 5/1960 | Berman | A47B 91/02 182/204 |
| 2,978,712 | A | * | 4/1961 | Blanke | A47B 91/02 248/188.5 |
| 3,215,382 | A | * | 11/1965 | Stein | A47D 11/02 248/172 |
| 3,875,712 | A | * | 4/1975 | Thompson | E04B 1/2403 108/153.1 |
| 3,952,983 | A | * | 4/1976 | Crochet | A47C 3/38 248/173 |
| D286,255 | S | * | 10/1986 | Gage | D7/332 |
| 4,850,645 | A | * | 7/1989 | Crockett | A61G 5/14 297/330 |
| 4,934,720 | A | * | 6/1990 | Dobron | B62B 5/0083 108/56.1 |
| 5,060,896 | A | * | 10/1991 | Hobbins | A47B 91/02 248/188.2 |

(Continued)

FOREIGN PATENT DOCUMENTS

NZ   WO 2007011243 A1 *  1/2007 ............. A47B 91/02

*Primary Examiner* — Rodney Mintz
(74) *Attorney, Agent, or Firm* — Meroni & Meroni, P.C.; Charles F. Meroni, Jr.

(57) ABSTRACT

A chair riser assembly supports a chair in an elevated position relative to a primary support surface for providing the chair user with a slightly raised seat elevation for aiding the chair user in rising from the riser-supported chair. The chair riser assembly includes a series of corner post assemblies each of which have a lower post end for engaging the primary support surface. Two width adjustment assemblies adjustably interconnect paired, laterally spaced the post assemblies for enabling the user to adjust the lateral width of the riser assembly for accommodating variously sized chairs. Laterally opposed chair support assemblies interconnect forward portions of the chair riser assembly to rearward portions of the chair riser assembly. Each chair support assembly includes a chair support portion in superior adjacency to the lower post ends for supporting lower portions of the chair in superior adjacency to the primary support surface.

17 Claims, 11 Drawing Sheets

(56) References Cited

U.S. PATENT DOCUMENTS

| | | | | |
|---|---|---|---|---|
| 5,107,775 A * | 4/1992 | Langlais | A47B 9/14 108/147.21 |
| 5,333,825 A * | 8/1994 | Christensen | A47C 3/38 108/144.11 |
| 5,599,031 A * | 2/1997 | Hodges | B62B 5/0083 280/35 |
| 5,899,422 A * | 5/1999 | Eke | A47C 3/38 108/144.11 |
| 6,109,625 A * | 8/2000 | Hewitt | B60B 33/0007 280/43.24 |
| 6,715,840 B2 * | 4/2004 | Martin | A47C 3/38 297/463.1 |
| 7,104,603 B2 * | 9/2006 | Keegan | A47D 1/004 297/151 |
| 7,309,051 B2 * | 12/2007 | McNeill | A47B 9/14 108/144.11 |
| 7,681,847 B2 * | 3/2010 | Levin | A47B 9/18 248/188.2 |
| 7,988,236 B2 * | 8/2011 | Brandtner | A47B 1/005 248/188.1 |
| 8,196,760 B1 * | 6/2012 | Gillespie | F16M 11/048 211/90.01 |
| 8,348,071 B1 * | 1/2013 | Janlert | F16M 5/00 211/175 |
| 8,438,716 B2 * | 5/2013 | Brandtner | A47B 91/005 29/525.01 |
| 2004/0124681 A1 * | 7/2004 | Dubrul | A47C 1/032 297/330 |
| 2007/0063112 A1 * | 3/2007 | Patterson | A47C 4/02 248/188.6 |
| 2007/0221800 A1 * | 9/2007 | Levin | A47B 9/18 248/188.2 |
| 2010/0044533 A1 * | 2/2010 | King | A47C 3/34 248/188.5 |
| 2012/0126085 A1 * | 5/2012 | Johnson | A47C 7/002 248/346.03 |
| 2014/0367544 A1 * | 12/2014 | Graves | A47F 3/14 248/346.02 |
| 2016/0084430 A1 * | 3/2016 | Kempf | G01G 21/23 73/431 |

* cited by examiner

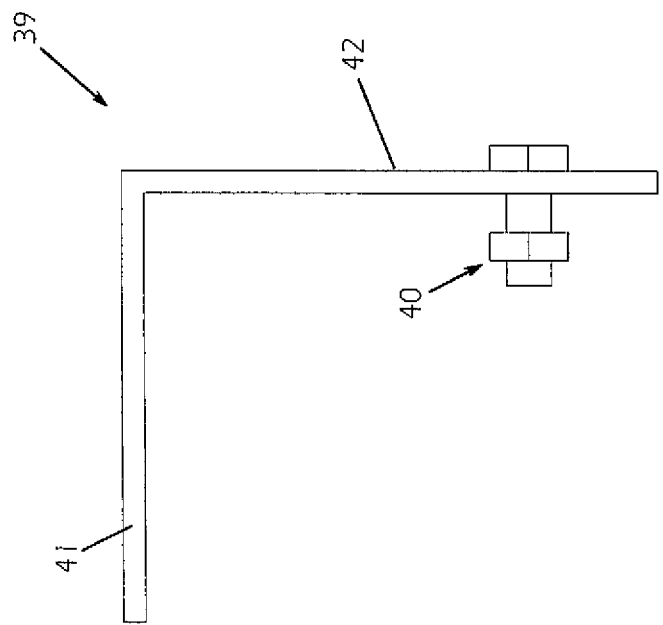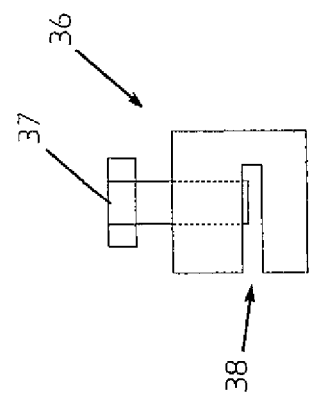

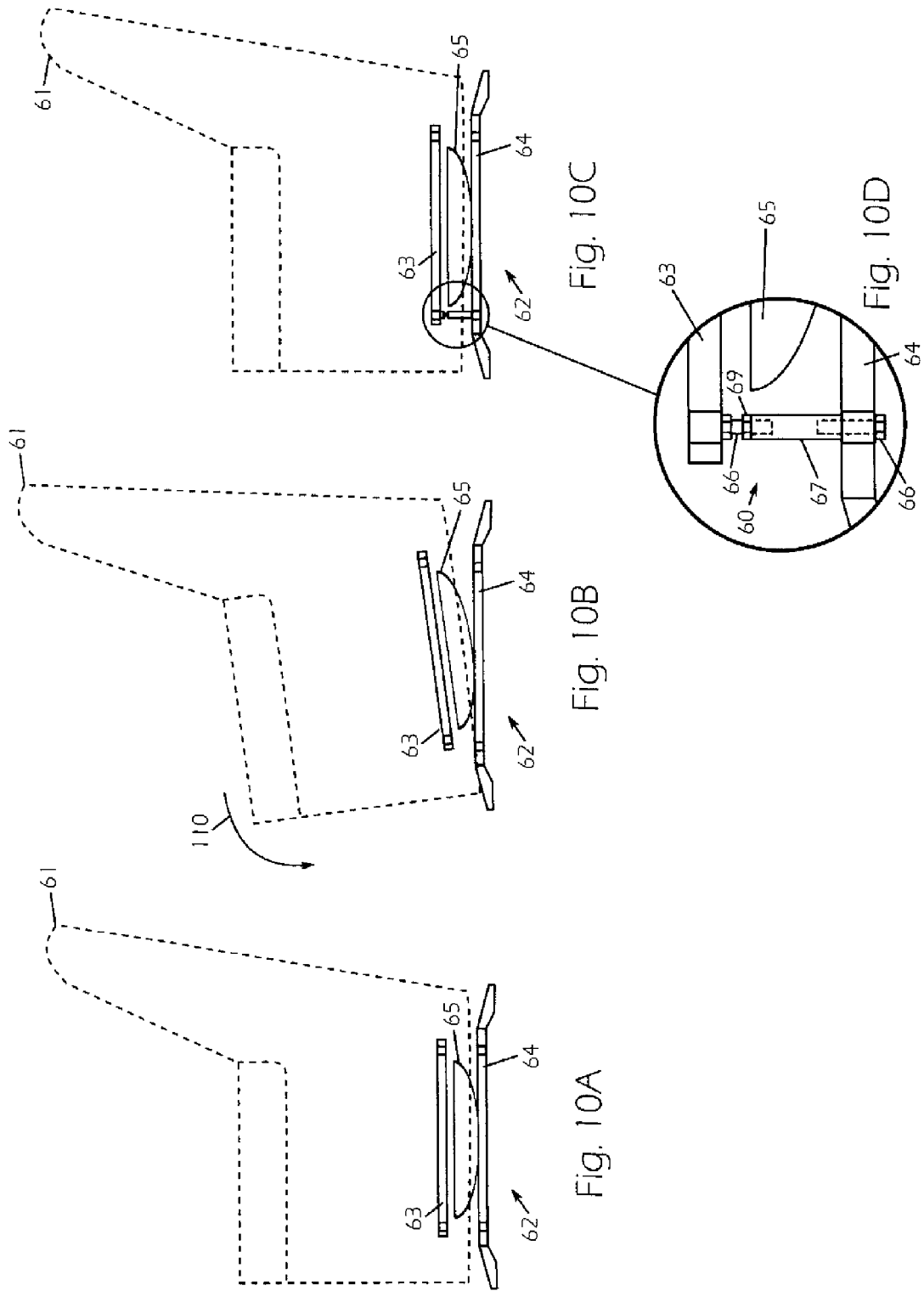

CHAIR RISER ASSEMBLY

PRIOR HISTORY

This non-provisional patent application claims the benefit of U.S. Provisional Patent Application No. 61/990,864 ('864 Application) filed in the United States Patent and Trademark Office (USPTO) on 9 May 2014.

BACKGROUND OF THE INVENTION

1. Field of the Invention

The present invention relates generally to a chair riser or support assembly. More particularly, the present invention relates to chair riser assembly for use in selectively supporting a chair at varying elevations so as to enable the user of the chair and chair riser assembly to more easily rise from a seated position upon the riser-supported chair.

2. Brief Description of the Prior Art

U.S. Pat. No. 4,850,645 ('645 patent), which issued to Crockett, discloses a Lifting Apparatus for a Seating Structure. The '645 patent describes an apparatus for elevating and lowering a freestanding seating structure, such as a house chair, recliner, or sofa. The apparatus is comprised of a base, an elevator assembly, a power assembly connected between the base and the elevator assembly, and a control assembly.

The elevator assembly releasably receives supports, elevates and lowers the seating structure. The power assembly provides power and supports and moves the elevator assembly. The control assembly controls the power assembly and the position of the elevator assembly relative to the base. The invention also includes riser arms which are pivotally connected between the base and the elevator assembly for structurally supporting the stabilizing the elevator assembly.

U.S. Pat. No. 6,715,840 ('840 patent), which issued to Martin, discloses a Furniture Support System. The '840 patent describes a furniture support system for elevating and angling furniture to assist individuals in standing up from a seated position. The furniture support system includes at least one first support member, and at least one second support member wherein the first support member is shorter in height than the second support member.

The support members are preferably constructed of a tapered structure with a broad lower end and a narrow upper end. At the upper end of each of the support members a cavity extends downwardly for receiving the leg of furniture member. A support plate may be attached to the bottom edge of a couch or other type of furniture that does not contain legs to ensure proper placement with the cavities of the support members.

U.S. Pat. No. 7,104,603 ('603 patent), which issued to Keegan et al., discloses a Booster Seat. The '603 patent describes an adjustable booster-type seat having a base for supporting the seat on a flat surface, a riser mounted for height adjustment on the base, a body support having a seat and back mounted for arcuate motion on the riser for changing the angular position of the body support and being adjustable in height by virtue of the adjustability of the riser on the base. A restraint bar is detachably connected to the body support and in turn adjustably carries a tray enabling the tray to be moved toward and away from the back and to be mounted at different angles with respect to the body support.

U.S. Pat. No. 7,988,236 ('236 patent), which issued to Brandtner, discloses an Integrated Base Assembly. The '236 patent describes a sofa having a furniture base assembly that is easily assembled without the need of a jig or fixture, provides for a reduced number of component parts, and provides for aesthetically pleasing base assembly joints. In one embodiment, the front rail member and the back rail member are integrally formed with the corner block members, side rails are connected thus forming an integrated rail member and thereby dispensing with a base joint exposed on the front of the furniture product. The base is affixed to the sofa frame and upholstery is attached to the frame for providing a finished sofa with a base.

United States Patent Application Publication No. 2004/0124681, which was authored by Dubrul et al., describes an Easy Riser Chair Lifter Apparatus and certain Methods of Use. Dubrul et al. describe devices that raise the height of a chair so that the effort to raise oneself from a sitting position is decreased. The device can be adapted to most any chair. Additionally the authors describe locking mechanism that prevents rocking or reclining to occur when the chairs are placed in the raised position.

United States Patent Application Publication No. 2007/0063112, which was authored by Patterson, describes a Collapsible Furniture Frame Method and Apparatus. Patterson describes a collapsible furniture frame comprising a plurality of elongated members having a tongue portion on each end. A key device has a first portion coupled to a surface of the elongated member near its end. The key device has a second portion configured according to a predetermined shape, such as a cylinder.

Each elongated member has a pair of key devices. A receiving block may be configured with a pair of grooves for receiving tongue portions for a pair of elongated members. The pair of grooves may be on adjacent sides so that the elongated members create a right angle relationship to each other when coupled to the receiving block. Each receiving block has a pair of key receptors configured to receive the predetermined shape so that the elongated member is in a lockable relationship with the receiving block.

United States Patent Application Publication No. 2007/0221800, which was authored by Levin, describes a Portable Device and Method for Raising the Height of Furniture. Levin's furniture-raising device described herein is collapsible, portable, stable, and easy to use. The device is designed to raise furniture to one or two preset increases in height. Preferably the device is used to raise the height of a chair. In one embodiment, the device contains a plurality of arms and a center base, where each arm is pivotably attached at a predetermined point in the base using a pin.

The locations for attachment of the pins are selected to be spaced far enough apart from each other to allow the arms to rotate about the pins from a first position, where the arms align with the legs in the article of furniture, to a second position, where the arms are aligned in the same general direction (i.e. the "storage position"), and to maximize the ability of the device to be as compact as possible in the storage position.

In a second embodiment, the device contains a plurality of arms and a center base, where each arm is pivotably and slidably attached to the base using a pin. In a third embodiment, the furniture raising device is designed to increase the device's strength and prevent breakage. In this embodiment, at least one portion of the center base either contacts the floor when the device is in use or hovers above the floor by at least approximately 1 mm.

As will be understood from a consideration of the foregoing art hereinabove being cited as exemplary to the state of the art, that there does not appear to be a chair riser assembly disclosed in the prior art that essentially comprises four corner post assemblies, two width adjustment assemblies, and two chair support assemblies arranged in such a manner so as to provide a chair riser assembly for supporting a chair in an elevated position relative to a primary support surface, which chair riser assembly essentially comprises a series of corner post assemblies, certain dynamically dimensioned lateral width adjustment means and certain fixed length laterally-opposed chair support means. Accordingly, the prior art perceives a need for such a chair riser assembly as briefly summarized in more detail hereinafter.

SUMMARY OF THE INVENTION

The present invention provides a chair riser assembly for supporting a chair in an elevated position relative to a primary support surface, which chair riser assembly slightly elevates a chair user's anatomy into a form more conducive to rising from the supported chair. The chair riser assembly according to the present invention essentially comprises four corner post assemblies, two width adjustment assemblies, and two chair support assemblies.

The four corner post assemblies essentially comprise first and second anterior post assemblies or a left anterior post assembly and a right anterior post assembly, and first and second posterior post assemblies or a left posterior post assembly and a right posterior post assembly. Each post assembly comprises a lower post end for engaging a primary support surface.

The two width adjustment assemblies essentially comprise an anterior width adjustment assembly and a posterior width adjustment assembly. The anterior width adjustment assembly adjustably interconnects the left and right anterior post assemblies, and the posterior width adjustment assembly adjustably interconnects the left and right posterior post assemblies.

The two chair support assemblies essentially comprise a left lateral support assembly and a right lateral support assembly. The left lateral support assembly is preferably integrally formed with left portions of the anterior and posterior width adjustment assemblies and interconnects the left anterior and posterior post assemblies, and the right lateral support assembly is preferably integrally formed with right portions of the anterior and posterior width adjustment assemblies and interconnects the right anterior and posterior post assemblies.

The left and right lateral support assemblies each comprise a chair support portion structurally located in superior adjacency to the lower leg ends for supporting lower leg portion of the chair in superior adjacency to the primary support surface. The anterior and posterior width adjustment assemblies may each further comprise a left lateral rail or left portion and a right lateral rail or right portion.

The left and right lateral rails each extend medially and are cooperable at a rail overlap zone for enabling the user to adjust the lateral width of the chair riser assembly. The chair riser assembly may preferably further comprise certain rail-guide means for guiding and maintaining structural cooperation of the left and right lateral rails as exemplified hereinabove.

The anterior and posterior width adjustment assemblies may each further preferably comprise certain clamping means for enabling the user to selectively clamp the left lateral rails into engagement with the right lateral rails for selectively fixing the lateral width of the chair riser assembly. The clamping means may be preferably defined by a screw clamp mechanism cooperable with slots formed in the left and right lateral rails for enabling the user to selectively screw clamp the left lateral rails into engagement with the right lateral rails.

The chair riser assembly may further comprise certain chair movement prevention means as variously referred to hereinabove as leg stop means for preventing anteriorly and/or posteriorly directed movement of the lower leg portions; leg retention means for preventing upwardly directed movement of the lower leg portions; and dive stop means for preventing forward inclinations of the chair bottom. All of said means may be embraced by the concept of chair movement prevention means.

Thus the chair movement prevention means or leg stop means may be preferably exemplified or defined by at least one screw block construction selectively affixed to the chair support portions via a screw mechanism. The chair movement prevention means or leg retention means may be exemplified or defined by at least one pivot pin assembly, the at least one pivot pin assembly being cooperable with at least one aperture formed in at least one upper support portion for enabling the user to selectively prevent the lower leg portion from moving in an upward direction.

The chair movement prevention means or dive stop means may be preferably and cooperably associated with a select post assembly, the select post assembly being selected from the group consisting of the four post assemblies, and may be preferably exemplified or defined by an L-shaped compression member fastened to the select post assembly. The compression member may preferably comprise an extension portion and a chair-engagement portion, which chair-engagement portion extends orthogonally relative the extension portion and engages a chair bottom for preventing movement at the site of engagement.

The four post assemblies may each further preferably comprise certain post length adjustment means for enabling the user to selectively adjust the vertical height of each post assembly and thus the chair riser assembly. The post length adjustment means may be preferably exemplified or defined by apertured telescopic leg portions and snap button means for selectively locking the apertured telescopic leg portions at a select telescopic position relative to one another.

BRIEF DESCRIPTION OF THE DRAWINGS

Other features of our invention will become more evident from a consideration of the following brief descriptions of illustrations of the subject invention:

FIG. 2A is an enlarged side elevational view of a set screw block construction according to the present invention.

FIG. 2B is an enlarged side elevational view of a pivot pin assembly according to the present invention.

FIG. 10A is a first sequential schematic side view type depiction of an alternative chair construction having a base assembly that enables at least forward inclinations, but which base assembly and alternative chair construction is depicted in a relaxed state or configuration.

FIG. 10B is a second sequential schematic side view type depiction of the alternative chair construction with base assembly otherwise shown in FIG. 10A depicted in a forward inclined state or configuration.

FIG. 10C is a third sequential schematic side view type depiction of the alternative chair construction with base assembly otherwise shown in FIGS. 10A and 10B outfitted with an alternative dive stop assembly according to the present invention for preventing forward dives or inclinations.

FIG. 10D is an enlarged fragmentary sectional view as sectioned and enlarged from FIG. 10C to show in greater detail the alternative dive stop assembly outfitted upon the alternative chair construction with base assembly for preventing forward dives or inclinations.

DETAILED DESCRIPTION OF THE PREFERRED EMBODIMENT

Figure 1:
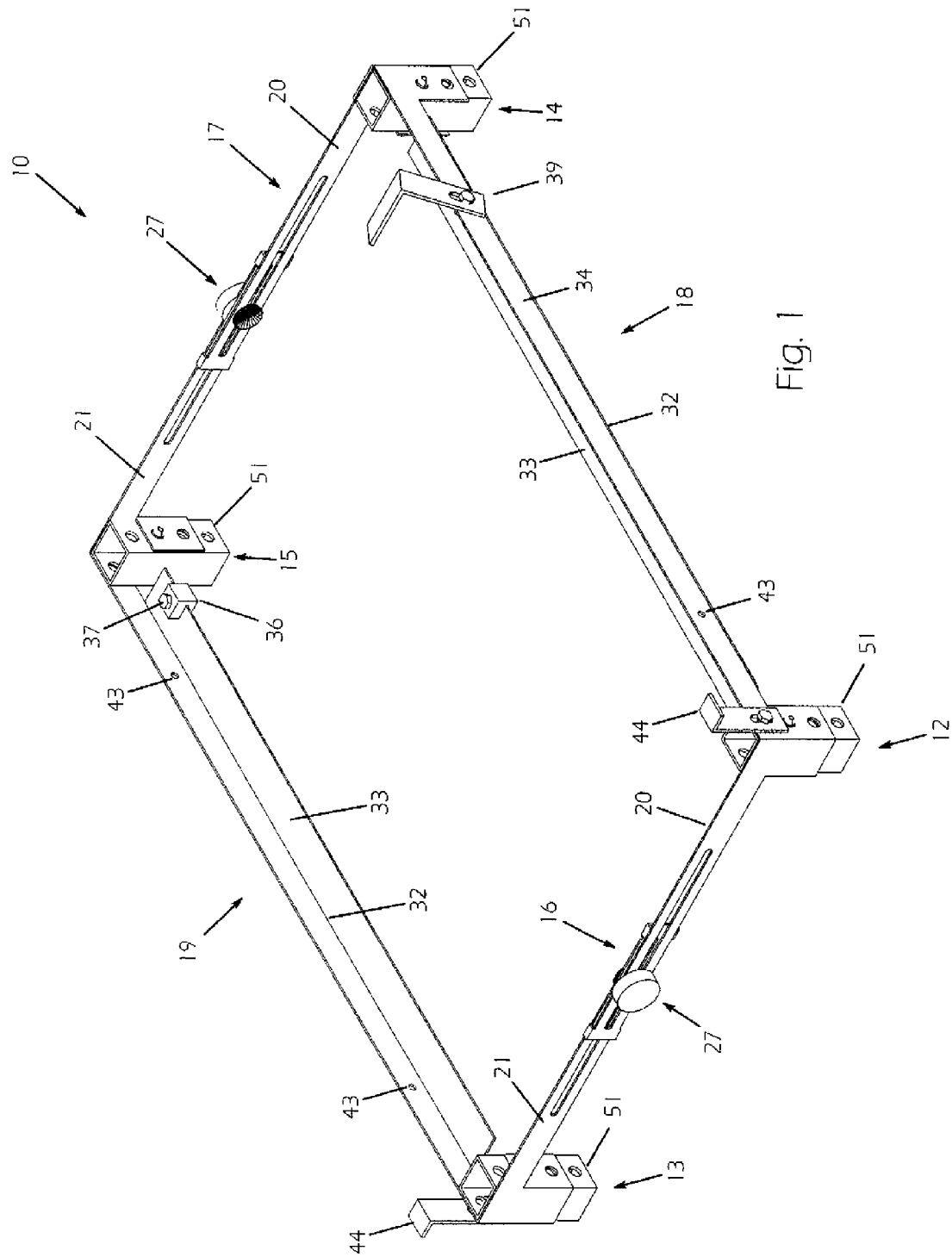
FIG. 1 is a top perspective view of the preferred chair riser assembly according to the present invention shown in an assembled state.
Figure 2:
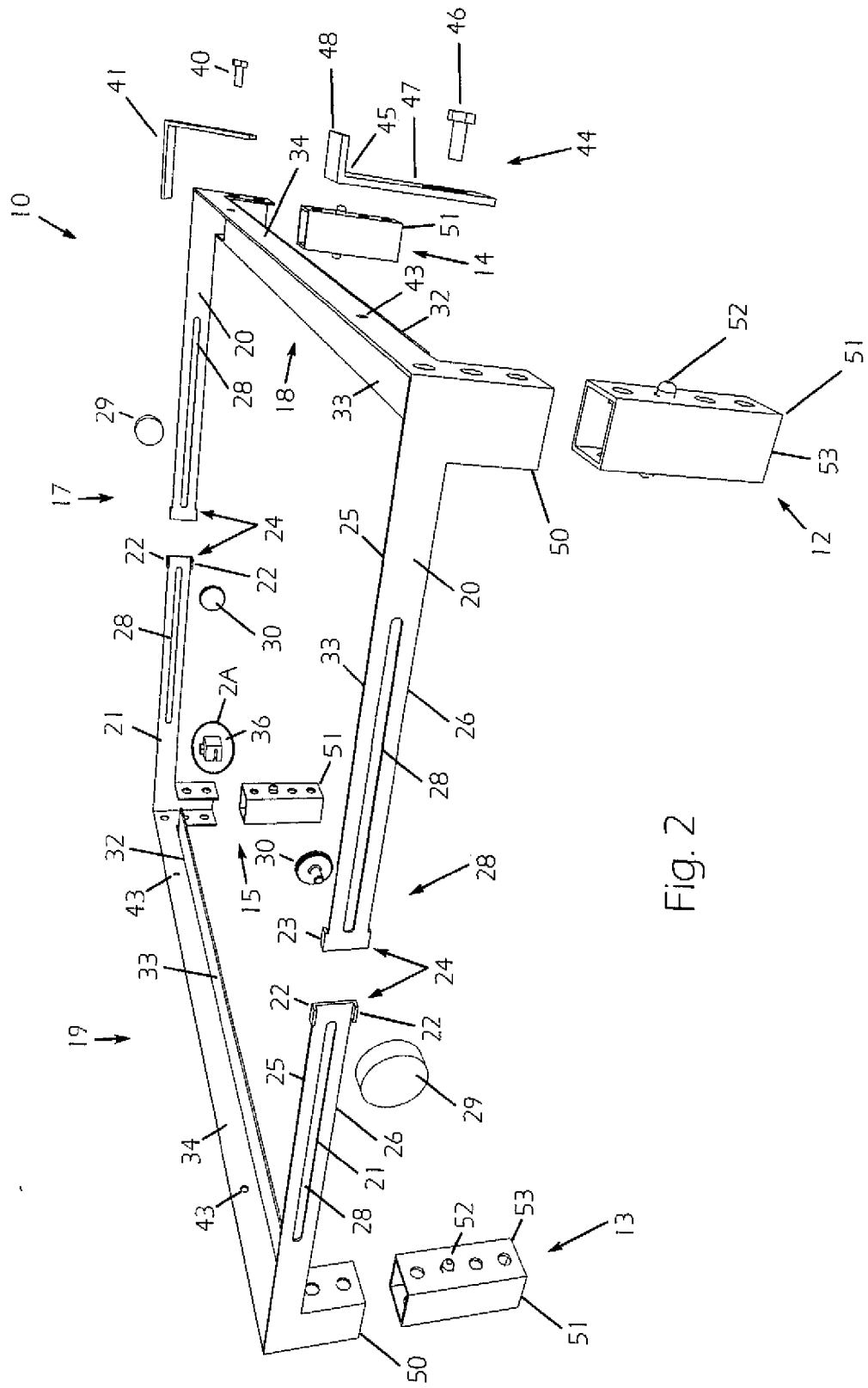
FIG. 2 is an exploded top perspective view of the preferred chair riser assembly according to the present invention.
Figure 3:
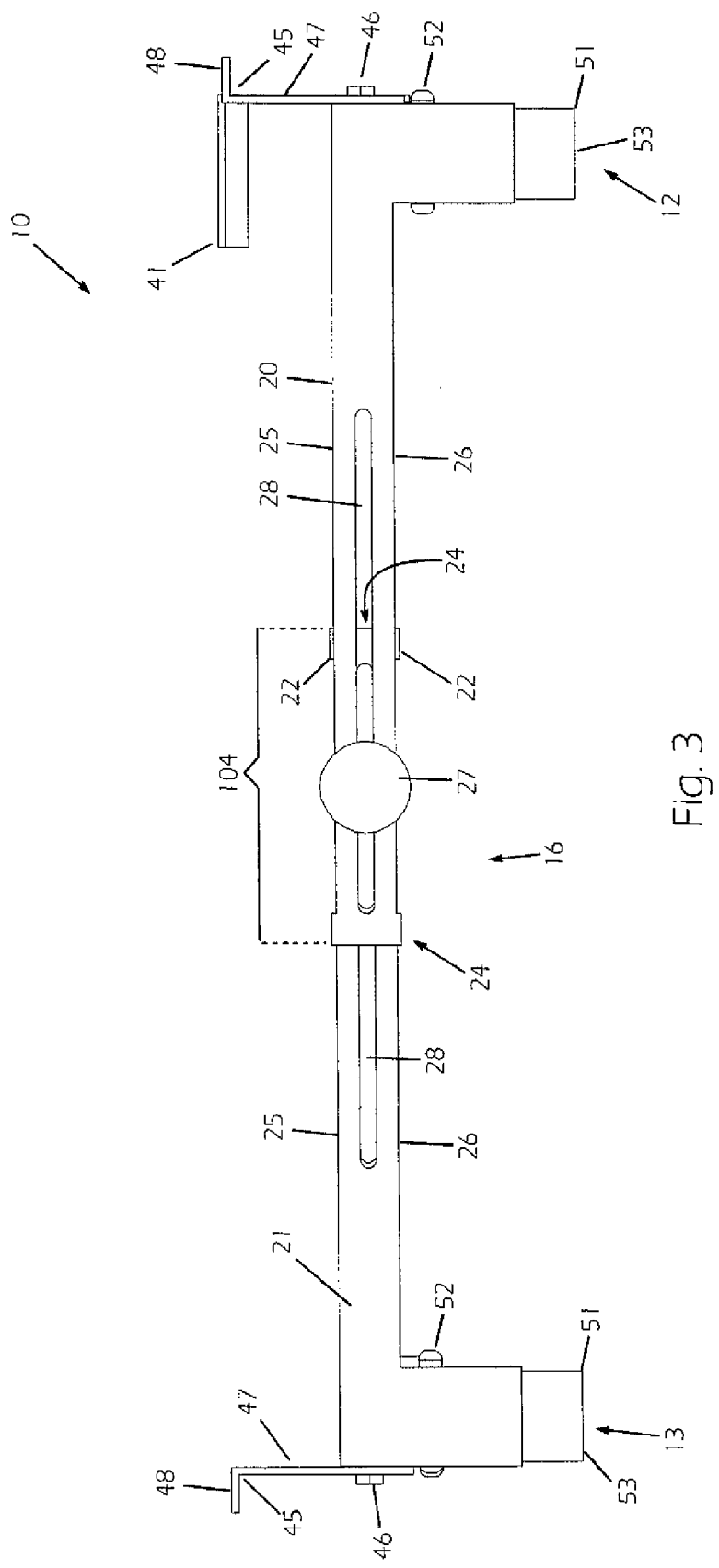
FIG. 3 is an anterior or frontal elevational view of the preferred chair riser assembly according to the present invention.
Figure 4:
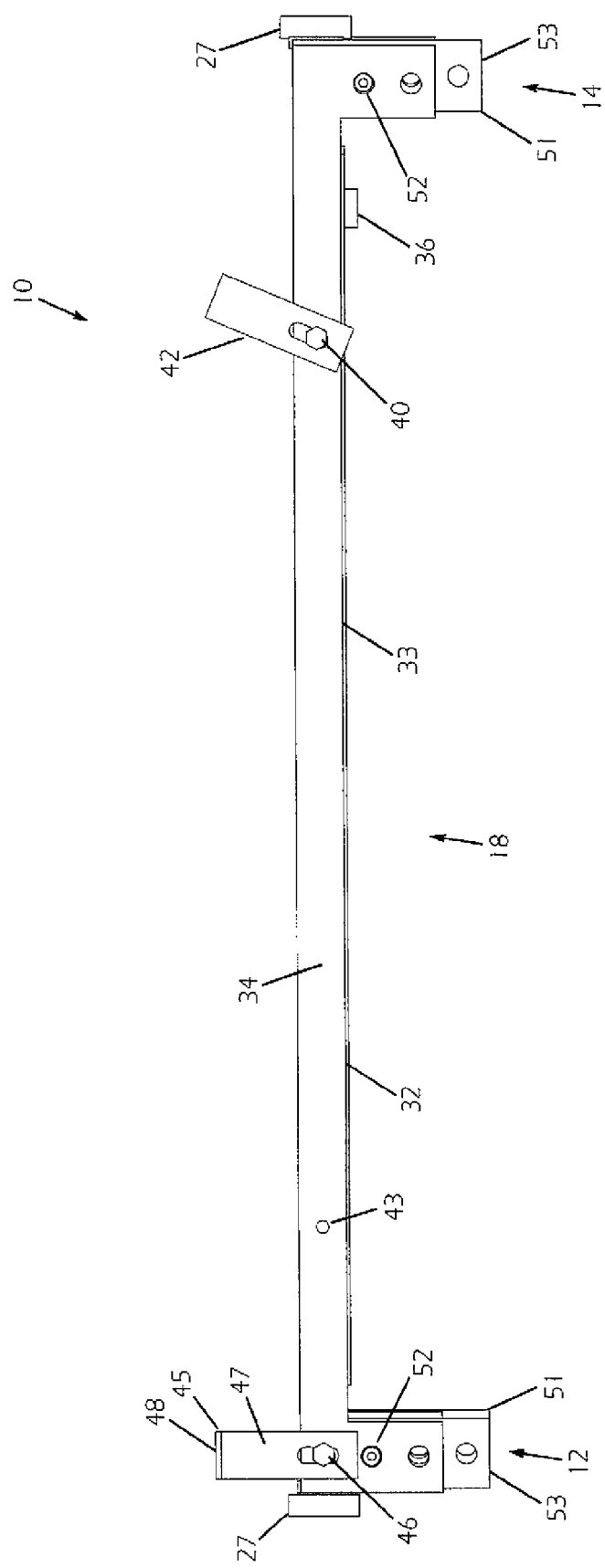
FIG. 4 is a left lateral side elevational view of the preferred chair riser assembly according to the present invention.
Figure 5:
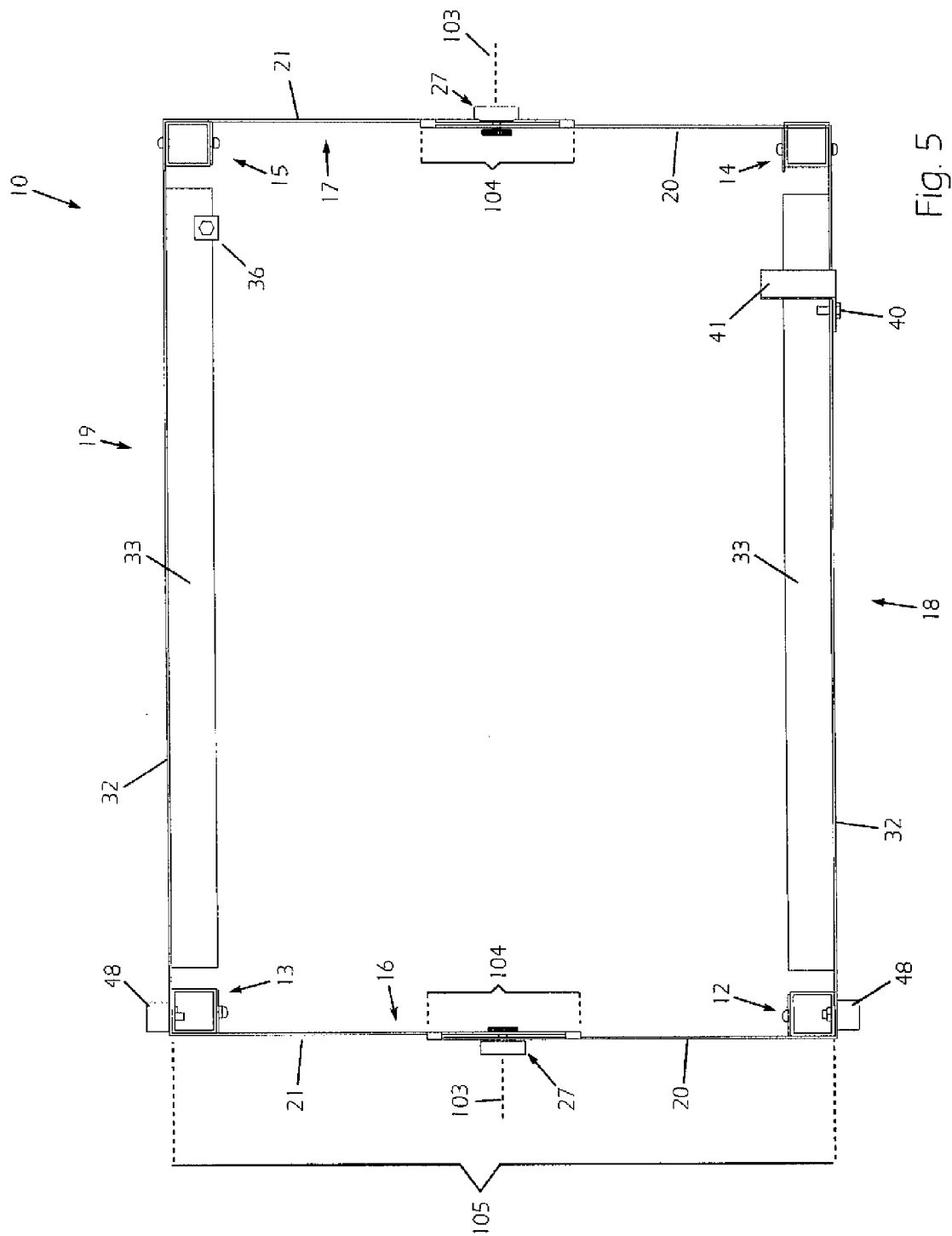
FIG. 5 is a top plan view of the preferred chair riser assembly according to the present invention.

Referring now to the drawings with more specificity, the preferred embodiment of the chair riser assembly 10 according to the present invention basically functions to support a chair 11 in an elevated position relative to a primary support surface 100 for slightly elevating a chair user's anatomy into a form more conducive to rising from the supported chair 11. In other words, a chair user 101 with a debilitating back, hip and/or leg condition may experience difficulty when rising from a chair 11 that is supported directly by the primary support surface 100 due to the distance between the user's seated position and the primary support surface 100 as generally depicted in FIG. 6A.

Figure 6:
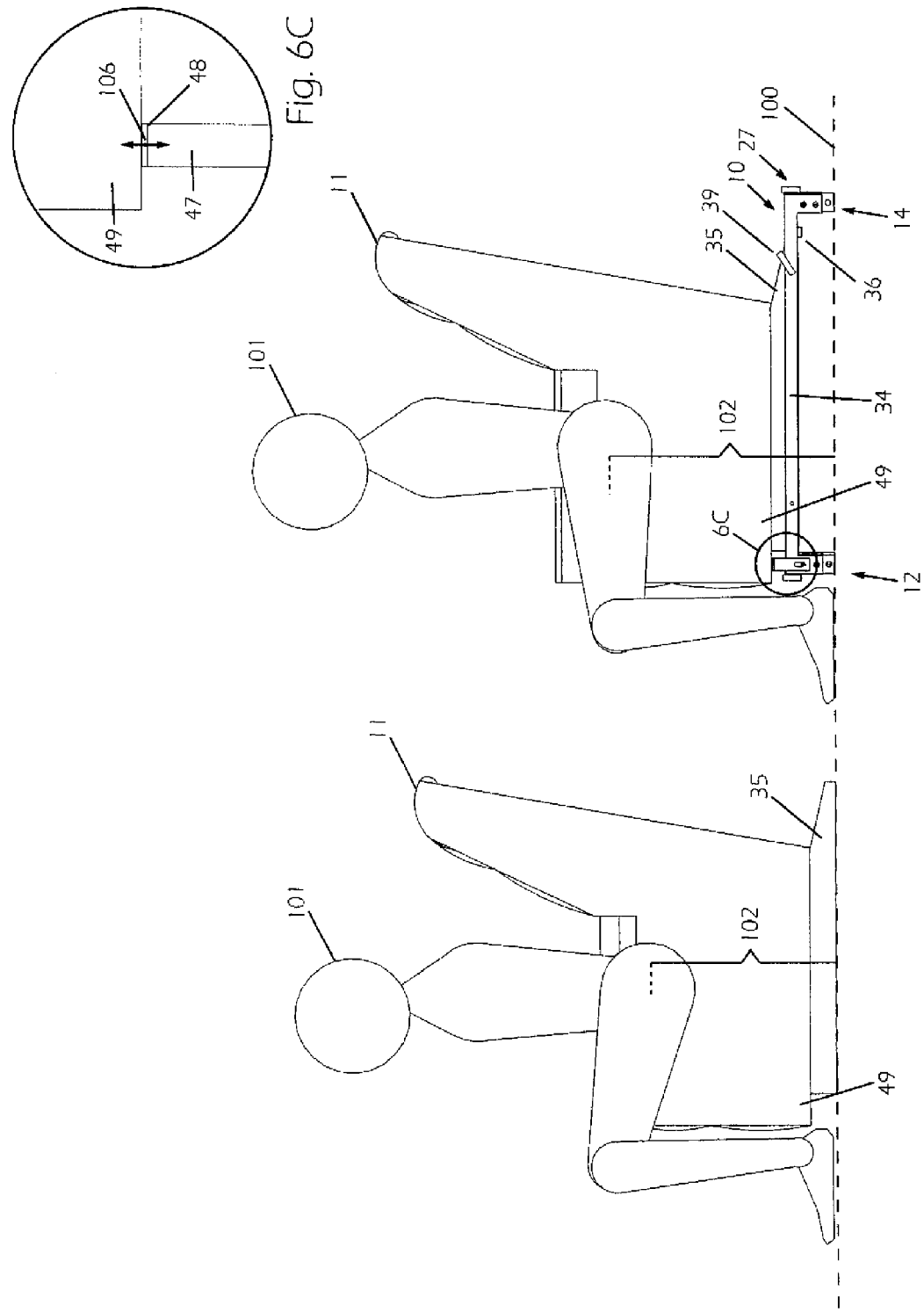
FIG. 6A is first schematic lateral view depiction of a non-user seated upon a chair directly supported by a primary support surface, the non-user's anatomy being shown in a first seated configuration.
FIG. 6B is a second schematic lateral view depiction of a user seated upon a chair indirectly supported by the primary support surface via the chair riser assembly according to the present invention, the user's anatomy being shown in a second seated configuration different than the first seated configuration.
FIG. 6C is an enlarged, fragmentary sectional view as sectioned from the an anterior junction site of the chair riser assembly and the riser-supported chair otherwise depicted in FIG. 6B, the view being presented to show in greater detail the dive stop assembly engaging the chair bottom for preventing chair inclinations at the site.
Figure 7:
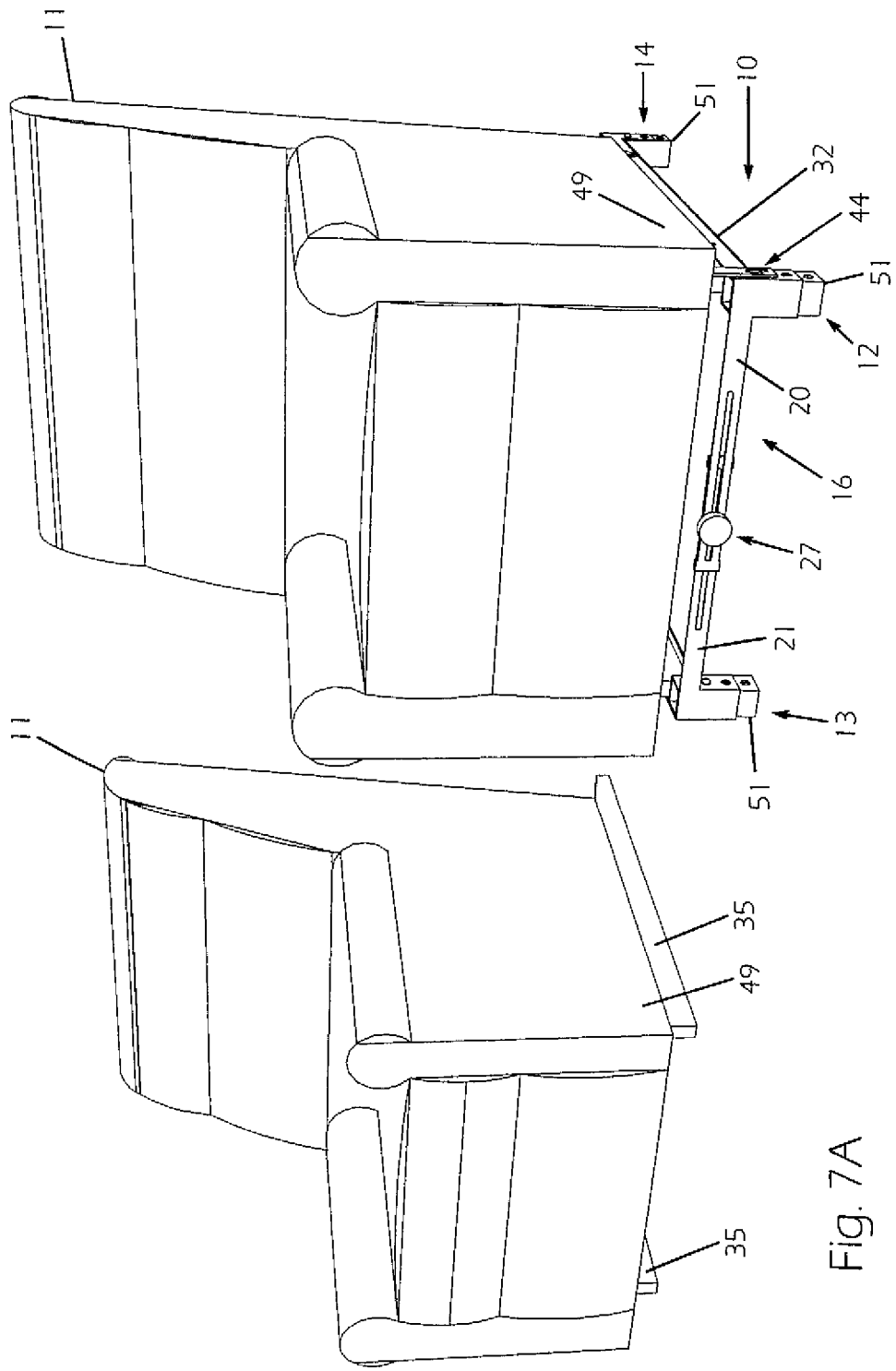
FIG. 7A is a first perspective view depiction of a chair directly supported by a primary support surface.
FIG. 7B is a second perspective view depiction of a chair indirectly supported by the primary support surface via the chair riser assembly according to the present invention.
Figure 8:
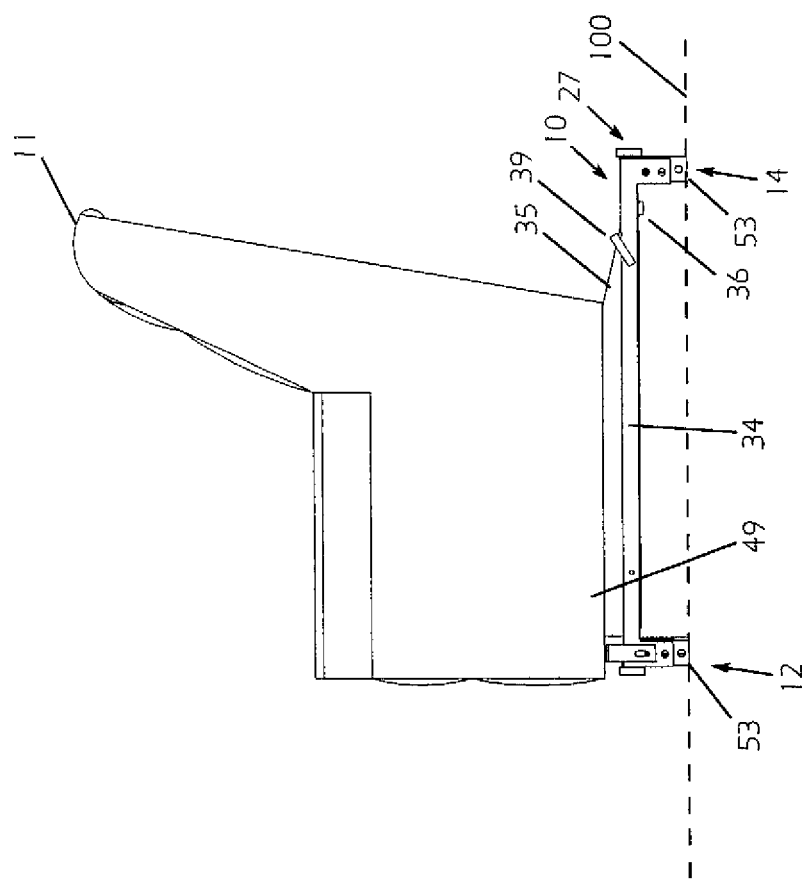
FIG. 8 is a left lateral elevational view of a chair supported by the chair riser assembly according to the present invention.

Comparing FIG. 6B to FIG. 6A, the reader will see that by altering or preferably raising the elevation 102 of the chair 11 by way of the chair riser assembly 10 according to the present invention, the chair user 101 may, in many instances more easily rise from the supported chair 11 due to the relative change in elevation 102. To achieve this primary functional objective, the chair riser assembly 10 according to the present invention preferably comprises four corner post assemblies, two width adjustment assemblies, and two chair support assemblies.

The four corner post assemblies preferably and/or essentially comprise a left anterior post assembly as at 12, a right anterior post assembly as at 13, a left posterior post assembly as at 14, and a right posterior post assembly as at 15. The four post assemblies may each preferably comprise certain post length adjustment means for enabling the user to selectively adjust the vertical height of the chair riser assembly 10 to aid the user in achieving an optimum height or elevation for the chair riser assembly 10 and thus an optimum dimension or elevation 102. It is contemplated that the post length adjustment means may be preferably exemplified or defined by telescopically cooperable apertured upper leg portions 50 and apertured lower leg portions 51 along with spring-biasable snap button means 52 for selectively locking the telescopic apertured upper and lower leg portions 50 and 51 relative to one another.

The two width adjustment assemblies preferably comprise an anterior width adjustment assembly as at 16 and a posterior width adjustment assembly as at 17. The anterior width adjustment assembly 16 adjustably interconnects the left and right anterior post assemblies 12 and 13, and the posterior width adjustment assembly 17 adjustably interconnects the left and right posterior post assemblies 14 and 15.

The anterior and posterior width adjustment assemblies 16 and 17 each preferably comprise a left lateral rail as at 20 and a right lateral rail as at 21. The left and right lateral rails 20 and 21 each extend medially towards the medial plane 103 of the chair riser assembly 10 and are cooperable and engageable at a rail overlap zone 104 for enabling the user to adjust the lateral width 105 of the chair riser assembly 10 for accommodating chairs 11 having varied chair widths.

The left and right lateral rails 20 and 21 of the anterior and posterior width adjustment assemblies 16 and 17 may preferably comprise certain rail-guide means for guiding and maintaining structural cooperation of the left and right lateral rails 20 and 21 at the rail overlap zone 104. In this regard, it is contemplated that the rail-guide means may be preferably exemplified or defined by anteriorly extending upper and lower flanges 22 and posteriorly extending upper and lower flanges 23. The upper and lower flanges 22 and 23 are preferably formed at select terminal ends as selected from terminal ends 24 of the left and right lateral rails 20 and 21 and engage upper rail portions 25 and lower rail portions 26 of the left and right lateral rails 20 and 21 at the rail overlap zone 104 for guiding and structurally maintaining cooperative engagement of the rails 20 and 21 at the rail overlap zone 104.

In this last regard, the drawings submitted in support of these specifications show the left lateral rails 20 comprising posteriorly extending flanges 23 at the terminal ends 24 thereof and the right lateral rails 21 comprising anteriorly extending flanges 22 at the terminal ends 24 thereof. This illustrated structural arrangement is believed exemplary but not critical to the practice of the invention and could conceivably be reversed such that left lateral rails comprise anteriorly extending flanges at the terminal ends, and the right lateral rails comprise posteriorly extending flanges at the terminal ends if the anterior-posterior relationship of the respective left and right lateral rails were to be reversed.

The anterior and posterior width adjustment assemblies 16 and 17 each further preferably comprise certain clamping means for enabling the user to selectively clamp the left lateral rails 20 into engagement with the right lateral rails 21 for selectively fixing the lateral width 105 of the chair riser assembly 10. The clamping means may be preferably exemplified or defined by a screw clamp mechanism as at 27 having a knob portion 29 and a screw-anchor portion 30.

Further, the left and right lateral rails 20 and 21 are each preferably slotted or comprise member-receiving slots as at 28. The screw clamp mechanisms 27 are cooperable with the slotted left and right lateral rails 20 and 21 at the rail overlap zone 104 for enabling the user to selectively screw clamp or fasten the left lateral rails 20 into structural engagement with the right lateral rails 21. In other words, the user may thus turn the knobs 29 relative to the screw-anchor portions 30 (extendable through or otherwise cooperable with the slots 28) for selectively tightening the clamp mechanisms 27 and thus drawing or clamping together the left and right lateral rails 20 and 21 for fixing the lateral width 105.

The two chair support assemblies essentially comprise a left lateral support assembly as at 18 and a right lateral support assembly as at 19. The left lateral support assembly 18 is preferably integrally formed with left portions of the anterior and posterior width adjustment assemblies 16 and 17, and basically functions to interconnect the left anterior and posterior post assemblies 12 and 14. Similarly, the right lateral support assembly 19 is preferably integrally formed with the laterally right portions of the anterior and posterior width adjustment assemblies 16 and 17, and interconnects the right anterior and posterior post assemblies 13 and 15.

The left and right lateral support assemblies 18 and 19 each comprise a chair support portion 33 structurally located in superior adjacency to the lower leg ends 53 for supporting the lower leg portion 35 of the chair 11 in superior adjacency to the primary support surface 100. The anterior and posterior width adjustment assemblies 16 and 17 may each further comprise a left lateral rail or left portion as at 20 and a right lateral rail or right portion as at 21 integrally formed at right angles to the upper support portions 34.

The anterior and posterior left and right lateral rails 20 and 21 each extend medially and are cooperable at a rail overlap zone 104 for enabling the user to adjust the lateral width of the chair riser assembly 10. The chair riser assembly 10 may preferably further comprise certain rail-guide means for guiding and maintaining structural cooperation of the left and right lateral rails as exemplified hereinabove.

The two chair support assemblies preferably comprise a left lateral support assembly as at 18, and a right lateral support assembly as at 19. The left lateral support assembly 18 is preferably integrally formed with the left lateral rails 20 or left portions of the anterior and posterior width adjustment assemblies 16 and 17 and structurally interconnects the left anterior and posterior post assemblies 12 and 14, and the right lateral support assembly 19 is preferably integrally formed with the right lateral rails 21 or right portions of the anterior and posterior width adjustment assemblies 16 and 17 and structurally interconnects the right anterior and posterior post assemblies 13 and 15.

The left and right chair support assemblies 18 and 19 each preferably comprise a transversely L-shaped structural support member as at 32, which L-shaped structural support members 32 each have or comprise a horizontal chair support portion as at 33 and a vertical or upper support portion as at 34 orthogonal to the chair support portion 33. The chair support portions 33 function to receive and/or support lower leg portions 35 of chair 11 thereupon.

The chair riser assembly 10 according to the present invention may further preferably comprise certain leg stop means for preventing (e.g. rearward or posteriorly directed) movement of the lower leg portion(s) 35, which leg stop means may be preferably exemplified or defined by at least one set screw block construction as at 36. Each set screw block construction 36 is preferably and selectively affixed to a chair support portion 33 via a slot 38 formed in the block construction 36 and a cooperative screw mechanism 37 of the set screw block construction 36.

Figure 9:
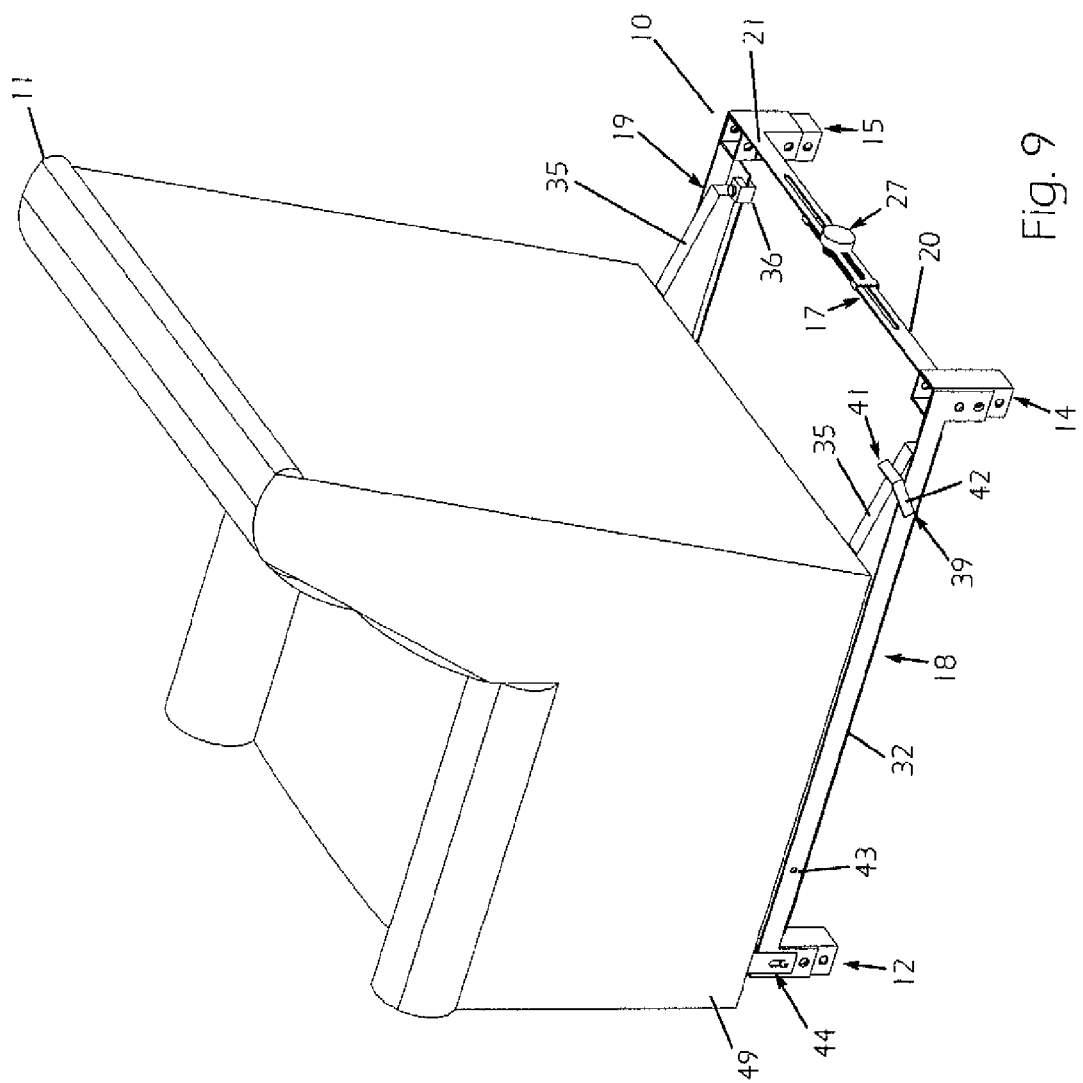
FIG. 9 is a posterior or rear top perspective view of a chair supported by the chair riser assembly according to the present invention.

The slot 38 receives the chair support portion(s) 33 and the set screw 37 may be rotated and/or used to tighten the set screw block construction 36 to the chair support portion(s) 33. It is contemplated that the set screw block construction 36 may preferably function to prevent posteriorly directed movement of the lower leg portion(s) 35 by being affixed to the chair support portion(s) 33 in posterior adjacency to the lower leg portion(s) 35 as generally depicted in FIG. 9, although it is conceivable that the block constructions could also be anchored to the chair support portion(s) 34 in anterior adjacency to the lower leg portions for preventing forward or anteriorly directed movement.

The chair riser assembly 10 according to the present invention may further preferably comprise certain leg hold-down or retention means for preventing (upward) movement of the lower leg portion(s) 35. The leg hold-down or retention means may be preferably exemplified or defined by at least one pivot pin assembly as at 39, which pivot pin assembly 39 comprises a fastener pin portion 40 and a leg-engaging arm portion 41 interconnected by an extension portion 42. The fastener pin portion 40 is rotatably cooperable with and insertable through apertures 43 formed in the upper support portions 34 of the members 32 for enabling the user to selectively prevent the lower leg portion(s) 35 from moving in an upward direction.

The chair riser assembly 10 according to the present invention may further preferably comprise certain chair dive stop means for preventing a supported chair 11 from forward inclinations or from diving forward during use. In this regard, it is contemplated that the dive stop means may be preferably exemplified or defined by a first dive stop assembly as at 44 usable with a first type of chair construction (as at chair 11) or a second dive stop assembly as at 60 usable with a second type of chair construction as at chair 61.

The dive stop assembly 44 may be preferably and cooperably associated with a select post assembly as selected from the group consisting of the left anterior post assembly 12 and the right anterior post assembly 13. It is contemplated that the dive stop assembly 44 according to the present invention may preferably be formed from or comprise an L-shaped compression member as at 45 fastened to the select post assembly via a fastener as at 46.

The L-shaped member 45 is thus preferably fastened to the select post assembly and comprises an extension portion 47 and a chair-engagement portion 48, which chair-engagement portion 48 preferably extends orthogonally relative the extension portion 47. The chair engagement portion 48 contacts the chair bottom 49 and the compressive strength of the member 45 prevents downward movement of the chair bottom 49 as depicted at equilibrium vector diagram 106.

As stated, the dive stop assembly 60 is usable in combination with a chair construction as at 61. The chair construction 61 preferably comprises a base assembly generically depicted at 62 which base assembly itself enables at least forward inclinations, which forward inclinations may handicap the user's ability to readily rise from the chair construction 61.

The generic base assembly 62 may be said to comprise an upper support member or structure as at frame member 63 and a lower support member or structure as at frame member 64 with certain means (as at 65) cooperatively interconnecting the frame members 63 and 64 for enabling at least forward (or downward-anterior) inclination 110 as generally depicted in FIG. 10B. To prevent the inclination 110, the dive stop assembly 60 is outfitted upon the base assembly 62.

The dive stop assembly 60 is basically an anti-compressive assembly insertable at the anterior portions of the structures 63 and 64 for preventing the inclination 110. The dive stop assembly 60 contemplated may thus preferably comprise two bolts as at 66, a threaded standoff as at 67, and a nut as at 69.

The standoff 67 is attached to frame member 64 with a lower bolt 66. The second upper bolt 66 has the nut 69 threaded onto it, then, is threaded into the other end of the standoff 67. By screwing the second, upper bolt 66 into the upper end of the standoff 67, the gap between the frame member 63 and itself is enlarged. Once the proper gap is set, it is locked into place with the nut 69 tightened against the standoff 67 for preventing the inclination 110.

While the foregoing specifications set forth much specificity, the same should not be construed as setting forth limits to the invention but rather as setting forth certain preferred key components and features. For example, it is contemplated that the essence of the present invention provides a chair riser assembly 10 for supporting a chair 11 in an elevated position relative to a primary support surface 100, which chair riser assembly 10 essentially comprises four corner post assemblies, two width adjustment assemblies, and two chair support assemblies.

The four corner post assemblies essentially comprise a left anterior post assembly as at 12, a right anterior post assembly as at 13, a left posterior post assembly as at 14, and a right posterior post assembly as at 15. Each post assembly comprises a lower post end as at 53 for engaging the primary support surface 100.

The two width adjustment assemblies essentially comprise an anterior width adjustment assembly as at 16 and a posterior width adjustment assembly as at 17. The anterior width adjustment assembly 16 adjustably interconnects the left and right anterior post assemblies 12 and 13, and the posterior width adjustment assembly 17 adjustably interconnects the left and right posterior post assemblies 14 and 15.

The two chair support assemblies essentially comprise a left lateral support assembly as at 18 and a right lateral support assembly as at 19. The left lateral support assembly 18 interconnects the left anterior and posterior post assemblies 12 and 14, and the right lateral support assembly 19 interconnects the right anterior and posterior post assemblies 13 and 15.

The left and right lateral support assemblies 18 and 19 each comprise a chair support portion as at 33 structurally located in superior adjacency to the lower post ends 53 for supporting lower leg portion 35 of the chair 11 in superior adjacency to the primary support surface 100.

The anterior and posterior width adjustment assemblies 16 and 17 may each further comprise a left lateral rail as at 20 and a right lateral rail as at 21. The left and right lateral rails 20 and 21 each extend medially and are cooperable at a rail overlap zone for enabling the user to adjust the lateral width 105 of the chair riser assembly 10. The chair riser assembly may preferably further comprise certain rail-guide means for guiding and maintaining structural cooperation of the left and right lateral rails 20 and 21 as exemplified hereinabove.

The anterior and posterior width adjustment assemblies may each further preferably comprise certain clamping means for enabling the user to selectively clamp the left lateral rails into engagement with the right lateral rails for selectively fixing the lateral width of the chair riser assembly. The clamping means may be preferably defined by a screw clamp mechanism cooperable with slots formed in the left and right lateral rails for enabling the user to selectively screw clamp the left lateral rails into engagement with the right lateral rails.

The chair riser assembly may further comprise certain chair movement prevention means as variously referred to hereinabove as leg stop means for preventing anteriorly and/or posteriorly directed movement of the lower leg portions; leg retention means for preventing upwardly directed movement of the lower leg portions; and dive stop means for preventing forward inclinations of the chair bottom. All of said means may be embraced by the concept of chair movement prevention means.

Thus the chair movement prevention means or leg stop means may be preferably exemplified or defined by at least one screw block construction selectively affixed to the chair support portions via a screw mechanism. The chair movement prevention means or leg retention means may be exemplified or defined by at least one pivot pin assembly, the at least one pivot pin assembly being cooperable with at least one aperture formed in at least one upper support portion for enabling the user to selectively prevent the lower leg portion from moving in an upward direction.

The chair movement prevention means or dive stop means may be preferably and cooperably associated with a select post assembly, the select post assembly being selected from the group consisting of the four post assemblies, and may be preferably exemplified or defined by an L-shaped compression member as at 45 fastened to the select post assembly. The compression member may preferably comprise an extension portion and a chair-engagement portion, which chair-engagement portion extends orthogonally relative the extension portion and engages a chair bottom for preventing movement at the site of engagement.

The four post assemblies may each further preferably comprise certain post length adjustment means for enabling the user to selectively adjust the vertical height of each post assembly and thus the chair riser assembly. The post length adjustment means may be preferably exemplified or defined by apertured telescopic leg portions and snap button means for selectively locking the apertured telescopic leg portions at a select telescopic position relative to one another.

Stated another way, the present invention may be said to essentially provide a chair riser assembly for supporting a chair in an elevated position relative to a primary support surface, which chair riser assembly essentially comprises a series of corner post assemblies, certain lateral width adjustment means and laterally opposed chair support means.

The corner post assemblies comprise first and second pairs of laterally spaced corner post assemblies, and each corner post assembly comprises a lower post end for engaging the primary support surface. The lateral width adjustment means as exemplified by the anterior and posterior width adjustment assemblies dynamically or adjustably interconnect the first and second pairs of laterally spaced post assemblies.

The laterally opposed chair support means as exemplified by the left and right lateral support assemblies 18 and 19 statically or fixedly interconnect the lateral width adjustment means and first and second pairs of laterally spaced post assemblies. The laterally opposed chair support means comprise chair support portions in superior adjacency to the lower post ends for supporting lower leg portions of the chair in superior adjacency to the primary support surface.

The lateral width adjustment means as exemplified may further preferably comprise cooperable rails and clamping means for clamping the cooperable rails at a rail overlap zone for enabling the user to adjust a lateral width of the chair riser assembly. Further, as earlier stated the chair riser assembly may optionally and preferably comprise certain chair movement prevention means as variously exemplified for preventing movement of the chair relative to the chair riser assembly.

Accordingly, although the invention has been described by reference to certain preferred and alternative embodiments, it is not intended that the novel arrangements be limited thereby, but that modifications thereof are intended to be included as falling within the broad scope and spirit of the foregoing disclosures, the appended drawings, and the following claim limitations.

We claim:

1. A chair riser assembly for supporting a chair in an elevated position relative to a primary support surface, the chair riser assembly comprising:
   four corner post assemblies, the four corner post assemblies comprising a left anterior post assembly, a right anterior post assembly, a left posterior post assembly and a right posterior post assembly, each post assembly comprising a lower post end for engaging the primary support surface;
   two width adjustment assemblies, the two width adjustment assemblies comprising an anterior width adjustment assembly and a posterior width adjustment assembly, the anterior width adjustment assembly adjustably interconnecting the left and right anterior post assemblies, the posterior width adjustment assembly adjustably interconnecting the left and right posterior post assemblies;
   the anterior and posterior width adjustment assemblies each comprise a left and a right lateral rail, the left and right lateral rails each extending medially and being cooperable at a rail overlap zone for enabling a user to adjust a lateral width of the chair riser assembly;
   the left and right lateral rails each being slotted;
   a screw clamp mechanism cooperable with the anterior and posterior width adjustment assemblies, the screw clamp mechanism fitting within the slots of the left and right lateral rails enabling the user to selectively clamp the left lateral rails into engagement with the right lateral rails and capable of selectively fixing the lateral width of the chair riser assembly; and
   two chair support assemblies, each of the two chair support assemblies being a continuous unitary structure of one-piece construction, the two chair support assemblies comprising a left lateral support assembly and a right lateral support assembly, the left lateral support assembly interconnecting the left anterior and posterior post assemblies, the right lateral support assembly interconnecting the right anterior and posterior post assemblies, the left and right lateral support assemblies each comprising a chair support portion in superior adjacency to the lower post ends for supporting lower leg portions of the chair in superior adjacency to the primary support surface.

2. The chair riser assembly of claim 1 wherein the anterior and posterior width adjustment assemblies are independently adjustable.

3. The chair riser assembly of claim 1 wherein the screw clamp mechanism comprises a knob portion and a screw-anchor portion.

4. The chair riser assembly of claim 3 wherein the left and right lateral rails each have guide flanges on terminal ends thereof;
   the guide flanges of the left lateral rail mateable to top and bottom portions of the right lateral rail and the guide flanges of the right lateral rail mateable to top and bottom portions of the left lateral rail.

5. The chair riser assembly of claim 1 comprising leg stop means for preventing movement of the lower leg portions.

6. The chair riser assembly of claim 5 wherein the leg stop means are defined by at least one screw block construction, the screw block construction being selectively affixed to the chair support portions via a screw mechanism.

7. The chair riser assembly of claim 1 comprising leg retention means for preventing movement of the lower leg portions.

8. The chair riser assembly of claim 7 wherein the left and right chair support assemblies each comprise an upper support portion orthogonal to the chair support portion, and the leg retention means are defined by at least one pivot pin assembly, the at least one pivot pin assembly being cooperable with at least one aperture formed in at least one upper support portion for enabling the user to selectively prevent the lower leg portion from moving in an upward direction.

9. The chair riser assembly of claim 1 comprising dive stop means for preventing the supported chair from diving forward during use.

10. The chair riser assembly of claim 9 wherein the dive stop means are cooperably associated with a select post assembly, the select post assembly being selected from the group consisting of the left anterior post assembly and the right anterior post assembly.

11. The chair riser assembly of claim 10 wherein the dive stop means comprises an L-shaped compression member, the L-shaped compression member being fastened to the select post assembly and comprising an extension portion and a chair-engagement portion, the chair-engagement portion extending orthogonally relative the extension portion for engaging a chair bottom, the L-shaped compression member thus for preventing downward movement of the chair bottom.

12. The chair riser assembly of claim 1 wherein the four post assemblies each comprise post length adjustment means for enabling the user to selectively adjust a vertical height of each post assembly and thus the chair riser assembly;
   wherein the four post assemblies are hollow for receiving the post length adjustment means, the post length adjustment means defined by apertured telescopic leg portions and snap button means for selectively locking the apertured telescopic leg portions at a select telescopic position relative to one another.

13. The chair riser assembly of claim 12 wherein the apertured telescopic leg portions are rectangular when viewed along a vertical axis of the four post assemblies.

14. A chair riser assembly for supporting a chair in an elevated position relative to a primary support surface, the chair riser assembly comprising:
   four corner post assemblies, the four corner post assemblies comprising first and second pairs of laterally spaced corner post assemblies, each corner post assembly comprising a lower post end for engaging the primary support surface;
   wherein each corner post assembly comprises a hollow post cooperatively connected to a telescoping insert;
   first and second width adjustment assemblies, the first width adjustment assembly adjustably interconnecting the first pair of laterally spaced corner post assemblies, the second width adjustment assembly adjustably interconnecting the second pair of laterally spaced corner post assemblies;
   the first and second width adjustment assemblies each comprise a left and a right lateral rail, the left and right lateral rails each extending medially and being cooperable at a rail overlap zone for enabling a user to adjust a lateral width of the chair riser assembly;
   the left and right lateral rails each being slotted;
   a screw clamp mechanism cooperable with the first and second width adjustment assemblies, the screw clamp mechanism fitting within the slots of the left and right lateral rails enabling the user to selectively clamp the left lateral rails into engagement with the right lateral rails and capable of selectively fixing the lateral width of the chair riser assembly; and laterally opposed chair support assemblies, the laterally opposed chair support assemblies interconnecting the first width adjustment assembly and first pair of laterally spaced corner post assemblies to the second width adjustment assembly and second pair of laterally spaced corner post assemblies, the laterally opposed chair support assemblies each comprising a chair support portion in superior adjacency to the lower post ends for supporting lower leg portions of the chair in superior adjacency to the primary support surface.

15. The chair riser assembly of claim 14 wherein the left and right lateral rails each have guide flanges on terminal ends thereof;

the guide flanges of the left lateral rail mateable to top and bottom portions of the right lateral rail and the guide flanges of the right lateral rail mateable to top and bottom portions of the left lateral rail.

16. The chair riser assembly of claim 14 comprising chair movement prevention means for preventing movement of the chair relative to the chair riser assembly;

the chair movement prevention means comprising a compression member, the compression member being fastened to the chair riser assembly and comprising an extension portion and a chair-engagement portion, the chair-engagement for engaging a chair bottom, the compression member thus for preventing downward movement of the chair bottom.

17. The chair riser assembly of claim 14 wherein the telescoping inserts having a pushpin portion and each said corner post having cooperable hole portions allowing the user to selectively adjust a vertical height of each post assembly and thus the chair riser assembly.

* * * * *